(12) United States Patent
Senn et al.

(10) Patent No.: US 9,494,349 B2
(45) Date of Patent: Nov. 15, 2016

(54) APPARATUS AND METHOD FOR FLUID HEATING AND ASSOCIATED SYSTEMS

(75) Inventors: David Charles Senn, Auckland (NZ); Daniel Rupert Gadd, Dunedin (NZ)

(73) Assignee: MATRIX ENGINEERING LIMITED, Auckland (NZ)

( * ) Notice: Subject to any disclaimer, the term of this patent is extended or adjusted under 35 U.S.C. 154(b) by 1315 days.

(21) Appl. No.: 12/923,260

(22) Filed: Sep. 10, 2010

(65) Prior Publication Data
US 2011/0067418 A1 Mar. 24, 2011

Related U.S. Application Data

(63) Continuation-in-part of application No. PCT/NZ2009/000033, filed on Mar. 10, 2009.

(30) Foreign Application Priority Data

Mar. 10, 2008 (NZ) ........................................ 566587

(51) Int. Cl.
*F25D 17/00* (2006.01)
*F25B 30/02* (2006.01)
*F24D 17/02* (2006.01)

(52) U.S. Cl.
CPC ................ *F25B 30/02* (2013.01); *F24D 17/02* (2013.01); *F25B 2339/047* (2013.01);
(Continued)

(58) Field of Classification Search
CPC ................ F25B 30/02; F25B 2339/047; F25B 2600/13; F25B 2700/21161; F25B
(Continued)

(56) References Cited

U.S. PATENT DOCUMENTS 1,569,499 A * 1/1926 Kagi ....................... F25B 39/04
165/156
3,171,387 A * 3/1965 Muller ....................... F24H 1/52
122/250 R
(Continued)

FOREIGN PATENT DOCUMENTS

DE 42 06 074 9/1993
NZ 187940 7/1978
(Continued)

OTHER PUBLICATIONS

Patent Abstract of JP 09-060987 A, 1 page.
Patent Abstract of JP 2004-226036 A, 1 page.

*Primary Examiner* — Ljiljana Ciric
(74) *Attorney, Agent, or Firm* — Jacobson Holman, PLLC.

(57) ABSTRACT

A fluid heater employs a vapor compression cycle system. The vapor compression cycle system includes an evaporator, at least one condenser and a working fluid. The fluid heater includes a fluid conduit which forms a tube-in-tube heat exchanger with the condenser to effect heating of the fluid. A sensor is positioned at the condensing zone of the working fluid, to determine the temperature of the working fluid at the condensing phase of the vapor compression cycle. The output of the sensor is used to control the flow rate of fluid through the fluid conduit in order to achieve a desired target temperature of the fluid leaving the conduit.

40 Claims, 10 Drawing Sheets

(52) U.S. Cl.
CPC .. *F25B 2600/13* (2013.01); *F25B 2700/21161* (2013.01); *F25B 2700/21163* (2013.01); *Y02B 30/745* (2013.01)

(58) Field of Classification Search
CPC ....................... 2700/21163;F24D 17/02; Y02B 30/745
USPC .......................................................... 62/181
See application file for complete search history.

(56) References Cited

U.S. PATENT DOCUMENTS

| | | | | |
|---|---|---|---|---|
| 3,967,590 A * | 7/1976 | Hays | ...................... | F24H 1/403 |
| | | | | 122/4 R |
| 3,997,109 A * | 12/1976 | Hays | ...................... | F23N 5/123 |
| | | | | 237/8 R |
| 4,103,509 A * | 8/1978 | Bottum | ................. | F24F 3/1405 |
| | | | | 62/238.2 |
| 4,193,269 A | 3/1980 | Barry | | |
| 4,226,606 A * | 10/1980 | Yaeger | .................... | F24D 17/02 |
| | | | | 62/238.6 |
| 4,330,309 A | 5/1982 | Robinson, Jr. | | |
| 4,373,346 A * | 2/1983 | Hebert | .................. | F25B 29/003 |
| | | | | 62/160 |
| 4,380,912 A * | 4/1983 | Edwards | ................. | F25B 39/04 |
| | | | | 165/154 |
| 4,467,785 A * | 8/1984 | Langford | ............. | B01D 53/261 |
| | | | | 126/400 |
| 4,492,091 A * | 1/1985 | Whitwell | ................ | F24D 17/02 |
| | | | | 122/15.1 |
| 4,522,253 A * | 6/1985 | Levin | .................. | F24D 11/0214 |
| | | | | 165/207 |
| 4,574,870 A | 3/1986 | Weitman | | |
| 4,653,287 A * | 3/1987 | Martin, Jr. | .......... | F24D 11/0214 |
| | | | | 237/2 B |
| 4,901,537 A * | 2/1990 | Yoshikawa | ......... | E04F 11/1842 |
| | | | | 236/20 R |
| 5,052,187 A | 10/1991 | Robinson, Jr. | | |
| 5,174,130 A * | 12/1992 | Lucas | .................. | F02G 1/0435 |
| | | | | 417/207 |
| 5,509,274 A * | 4/1996 | Lackstrom | .............. | E04H 4/129 |
| | | | | 237/2 B |
| 5,560,217 A * | 10/1996 | Takahashi | .......... | B60H 1/00392 |
| | | | | 62/200 |
| 5,641,016 A * | 6/1997 | Isaji | .................... | B60H 1/00007 |
| | | | | 165/43 |
| 5,816,494 A * | 10/1998 | Pohjalainen | ............ | F24D 19/10 |
| | | | | 237/8 R |
| 5,866,880 A * | 2/1999 | Seitz | ..................... | F24H 9/2028 |
| | | | | 219/483 |
| 6,080,971 A * | 6/2000 | Seitz | ..................... | F24H 9/2028 |
| | | | | 219/483 |
| 6,109,339 A * | 8/2000 | Talbert | ................ | F24D 11/0214 |
| | | | | 126/101 |
| 6,205,799 B1 * | 3/2001 | Patel | ...................... | F25B 39/04 |
| | | | | 165/104.33 |
| 6,349,554 B2 * | 2/2002 | Patel | ......................... | 165/104.33 |
| 6,430,949 B2 | 8/2002 | Noro | | |
| 6,467,288 B2 | 10/2002 | Kuroki | | |
| 6,581,384 B1 * | 6/2003 | Benson | ................... | F01K 25/08 |
| | | | | 60/653 |
| 6,604,376 B1 * | 8/2003 | Demarco | ................ | F24D 17/02 |
| | | | | 62/324.1 |
| 6,862,894 B1 * | 3/2005 | Miles | ........................ | F25B 6/04 |
| | | | | 62/181 |
| 7,810,456 B2 * | 10/2010 | Kobayashi | ............ | F24H 9/2035 |
| | | | | 122/20 R |
| 8,567,689 B2 * | 10/2013 | Eisenhower | ........ | F24D 17/0073 |
| | | | | 122/18.2 |
| 2002/0035841 A1 * | 3/2002 | Flynn | ..................... | C09K 5/045 |
| | | | | 62/217 |
| 2003/0196277 A1 * | 10/2003 | Hallman | ............... | D06F 43/086 |
| | | | | 8/142 |
| 2003/0196282 A1 * | 10/2003 | Fyvie | ..................... | D06F 43/08 |
| | | | | 15/3 |
| 2004/0045096 A1 * | 3/2004 | Mani | ..................... | D06F 43/086 |
| | | | | 8/142 |
| 2004/0117920 A1 * | 6/2004 | Fyvie | ................... | D06F 43/086 |
| | | | | 8/158 |
| 2005/0167516 A1 | 8/2005 | Saitoh | | |
| 2007/0012053 A1 | 1/2007 | Eisenhower | | |
| 2008/0041072 A1 * | 2/2008 | Seefeldt | ..................... | F24D 3/12 |
| | | | | 62/117 |
| 2008/0264075 A1 * | 10/2008 | Seefeldt | ..................... | F25B 1/10 |
| | | | | 62/81 |
| 2008/0276638 A1 * | 11/2008 | Seefeldt | ..................... | F25B 1/10 |
| | | | | 62/238.7 |
| 2008/0314064 A1 * | 12/2008 | Al-Eidan | ................ | F25B 13/00 |
| | | | | 62/324.6 |
| 2009/0266509 A1 * | 10/2009 | Pussell | .................... | F24D 3/082 |
| | | | | 165/47 |
| 2011/0067418 A1 * | 3/2011 | Senn | ....................... | F24D 17/02 |
| | | | | 62/115 |
| 2011/0296849 A1 * | 12/2011 | Benson | ................... | F01K 25/10 |
| | | | | 62/6 |
| 2014/0075970 A1 * | 3/2014 | Benson | ................... | F25B 27/02 |
| | | | | 62/79 |
| 2014/0216699 A1 * | 8/2014 | Lee | ......................... | F28D 7/024 |
| | | | | 165/163 |
| 2014/0360216 A1 * | 12/2014 | Boyko | .................... | F25B 47/02 |
| | | | | 62/278 |

FOREIGN PATENT DOCUMENTS

| | | |
|---|---|---|
| NZ | 250366 | 12/1994 |
| WO | 97/36138 | 10/1997 |
| WO | 2006/045143 | 5/2006 |

* cited by examiner

APPARATUS AND METHOD FOR FLUID HEATING AND ASSOCIATED SYSTEMS

This is a Continuation-in-Part of PCT/NZ09/00033 filed Mar. 10, 2009 and published in English, which has a priority of New Zealand no. 566587 filed Mar. 10, 2008, hereby incorporated by reference.

FIELD OF INVENTION

The present invention is a fluid heater and control system and related method for heat exchange of a refrigeration vapour compression cycle system. In particular but not solely the invention is a single pass fluid heater where the temperature of the fluid goes from a variable inlet temperature to a substantially fixed target outlet temperature in one pass, reliant on heat from a condenser of a refrigeration vapour compression cycle system.

BACKGROUND

Systems employing heat exchangers to heat fluids, for example water, reliant on heat from a condenser of a refrigeration vapour compression cycle are known. Swimming pool heaters utilizing heat pumps are an example.

These utilize a heat exchange at the condenser to elevate fluid temperature by a few degrees Celsius each time they pass through. Systems such as this rely on multiple cycles at high (often fixed) flow rates to heat the fluid to the desired temperature. Alternative heat exchanger systems rely on a single pass to heat the fluid to the required temperature. Temperature control in single pass systems is governed by controlling the flow rate of the heated fluid through the heat exchanger. The flow rate in single pass systems is invariably low to allow greater temperature increases in the heated fluid.

An advantage of the single pass heating method is its ability to produce higher outlet temperatures compared with multiple pass methods by utilizing the superheat in the working fluid to "boost" the temperature of the heated fluid stream. One of the side effects of reducing the flow so considerably is that the heat exchanger increases in length due to the reduction in the overall Heat Transfer Coefficient.

Heated fluid temperature control valves that modulate the heated fluid flow to achieve a set heated fluid outlet temperature, in a single pass system, are an accepted way to control heated fluid outlet temperature. Such control means may work acceptably well with a short flow path single pass heat exchanger. However, such means to control heated fluid outlet temperature becomes increasingly less reliable the longer the path of the heated fluid through a heat exchanger.

Heated fluid temperature regulating valves (with sensing element in the heated fluid outlet stream) also known as "thermostatically controlled valves") are well used and described in prior publications—see for example NZ 250366 and NZ 187940.

The difficulty in using heated fluid outlet temperature, particularly with a long flow path heat exchanger is that it takes time (sometimes a matter of minutes) for the heated fluid to travel the length of the exchanger, this makes it difficult for a feedback control system to respond to rapid changes in heated fluid inlet temperature and/or system conditions. Hence the use of heated fluid temperature control valves (thermostatically controlled valves), as described in the prior art NZ 250366 and NZ 187940 in longer flow path heat exchangers may result in the flow being subject to wide fluctuations, especially during the start-up phase of the refrigeration vapour compression cycle and during temperature and/or flow fluctuations in the system.

Water flow regulating valves using refrigerant pressure acting against a spring to control valve opening position for the purposes of controlling outlet water temperature are also known in the art (eg Robinson U.S. Pat. No. 4,330,309). Use of these valves to replace thermostatically controlled valves generally results in a much better control characteristic, although there are limitations for modern use. Limitations include the capital cost of the component, integration costs, lack of compatibility with electronic controls, inefficient use of energy and so forth.

It is an object of the present invention to provide a fluid heater and control system and related method for heat exchange of a refrigeration vapour compression cycle system with reduced fluctuations in the heated fluid outlet supply temperature and high efficiency and compared with methods known in the prior art.

BRIEF DESCRIPTION OF THE INVENTION

In a first aspect the present invention consists in a control system to control the flow rate of a fluid flowing relative to and in thermal contact with the condenser of a vapour compression cycle system, in order to control temperature elevation of the fluid by way of heat exchange with the working fluid, said control system comprising:

a sensor providing an output correlating to the temperature and/or pressure of the working fluid at the condensing phase of the vapour compression cycle system, a flow rate controller to control the rate of flow of fluid relative the condenser, a controller operatively connected with the flow rate controller to be able to vary the flow rate of the fluid, reliant on the output of said sensor.

Preferably the flow of fluid is capture in a conduit that together with the condenser form a heat exchanger.

Preferably the heat exchanger is a tube-in-tube type heat exchanger and the working fluid is contained in the annulus between the inner and outer tubes of said tube-in-tube heat exchanger.

Alternatively the heat exchanger is a plate heat exchanger, shell-and-coil heat exchanger, shell-and-tube heat exchanger or any other equivalent heat exchanger suitable for transferring heat between two fluids.

Preferably the sensor is located on an exterior surface of the outer tube of the tube-in-tube heat exchanger.

Preferably the conduit includes an inlet and an outlet for the flow of fluid.

Preferably the sensor is located at the condenser corresponding to a location after where the working fluid de-superheating occurs.

Preferably the sensor is located at the condenser corresponding to the condensing zone of the working fluid.

Preferably the sensor is located at the condenser, proximate the point of the condenser phase of the vapour compression cycle system where the working fluid first starts to condense.

Preferably the sensor is a temperature sensor and has a time constant of 3 seconds or less.

Preferably the controller and sensor have a time constant of less than 3 seconds.

Preferably the sensor is attached to the condenser in a high thermal conductivity manner to ensure rapid heat transfer between the sensor and condenser.

Preferably the sensor is attached to the condenser with high thermal conductivity paste, adhesive or potting compound.

Preferably the sensor is a pressure sensor, preferably connected to the conduit of the working fluid to enable it to sense the pressure of the working fluid in the condenser.

Preferably the fluid is water (preferably potable water).

Preferably the flow rate controller is a fluid pump.

Preferably the flow rate controller is a fluid flow regulating valve.

Preferably the operating parameters of the pump can be varied by the controller to vary the fluid flow rate.

Preferably the heat exchanger is a counter flow heat exchanger.

Preferably the temperature change of the fluid passing through the heat exchanger is greater than at least one of 10, 20, 30, 40 and 50 degrees Celsius.

Preferably the temperature elevation of the fluid is greater than at least one of 10, 20, 30, 40 and 50 degrees Celsius and is achieved in a single pass of fluid relative to the condenser.

Preferably a second sensor is provided to sense the temperature of the fluid leaving thermal contact with the condenser and to send a signal to the controller.

Preferably the controller receives a signal from the sensor(s) which it interprets to thereby vary the flow rate of fluid to achieve a desired target fluid temperature of fluid leaving thermal contact with the condenser.

Preferably the controller is one selected from a PID controller, feedback controller, fuzzy logic, P, PI controller.

Preferably the controller is a PID controller and where the controller receives a signal from the sensor which it processes using the P and D portions of the PID controller, the controller also receives a signal from the second sensor which it processes using the I portion of the PID controller, the controller using both signals to vary the flow rate of the fluid to achieve a target temperature of fluid leaving thermal contact with the condenser that is constant over time.

Preferably the controller is a PID controller and where the controller receives a signal from the sensor which it processes using the P and D portions of the PID controller, the controller also receives a signal from the second sensor which it processes using the I portion of the PID controller, the controller using both signals to vary the flow rate of the fluid to achieve a desired temperature of the fluid leaving thermal contact with the condenser that is preferably constant over time.

Preferably the fluid travels through the heat exchanger in a single pass.

In a second aspect the present invention consists in a control system to control the temperature increase of a fluid, to be varied in temperature by way of heat exchange with and flowing relative to a condenser of a vapour compression cycle system said control system comprising:

a sensor providing an output correlating to the temperature and/or pressure of the working fluid at the condensing phase of the vapour compression cycle system, a flow rate controller to control the rate of flow of fluid relative to the condenser, a controller operatively connected with the flow rate controller to vary the flow rate of the fluid reliant on the output of said sensor to thereby achieve a desired target temperature of the fluid leaving thermal contact with the condenser.

In a further aspect the present invention consists in a fluid heater comprising a vapor compression cycle system that includes an evaporator, at least one condenser and a working fluid, a fluid conduit through which a fluid can pass in thermal contact with the condenser to allow, via heat exchange between the fluid and the working fluid, the heating of the fluid, a sensor providing an output from which the temperature of the working fluid at the condensing phase of the vapor compression cycle system can be determined, a flow rate controller to control the flow rate of fluid through the conduit, a controller operatively connected with the flow rate controller to vary the flow rate of fluid through the conduit reliant on the output from the sensor to achieve a desired target temperature of the fluid leaving the conduit.

Preferably the condenser and the conduit form a heat exchanger that is a tube-in-tube type heat exchanger.

Preferably in the heat exchanger, the working fluid is contained in the annulus between the inner and outer tubes of said tube-in-tube heat exchanger.

Preferably the sensor is located on an exterior surface of the outer tube of the tube-in-tube heat exchanger.

Preferably the sensor is located after the working fluid de-superheating zone of the condenser.

Preferably the sensor is located at the condensing zone of the condenser.

Preferably the sensor is located at the condenser, at the condenser phase of the vapour compression cycle system where the working fluid first starts to condense.

Preferably the sensor is a temperature sensor and has a time constant of 3 seconds or less.

Preferably the controller and sensor have a time constant of less than 3 seconds.

Preferably the sensor is attached to the condenser in a high thermal conductivity manner to ensure rapid heat transfer between the sensor and condenser.

Preferably the sensor is attached to the condenser with high thermal conductivity paste, adhesive or potting compound.

Preferably the sensor is a pressure sensor.

Preferably the fluid is water (preferably potable water).

Preferably the flow rate controller is a fluid pump.

Preferably the flow rate controller is a fluid flow regulating valve.

Preferably the operating parameters of the pump can be varied by the controller to vary the fluid flow rate.

Preferably the heat exchanger is a counter flow heat exchanger.

Preferably the temperature change of the fluid is greater than at least one of 10, 20, 30, 40 and 50 degrees Celsius.

Preferably the temperature change of the fluid is greater than at least one of 10, 20, 30, 40 and 50 degrees Celsius and is achieved in a single pass through the conduit.

Preferably a second sensor is provided to sense the temperature of the fluid leaving the conduit and to send a signal to the controller.

Preferably the controller receives a signal from the sensor(s) which it interprets to thereby vary the flow rate of fluid through to achieve a desired target fluid temperature of the fluid leaving the conduit.

Preferably the controller is one selected from a PID controller, feedback controller, fuzzy logic, P, PI controller Preferably the controller is a PID controller and where the controller receives a signal from the sensor which it processes using the P and D portions of the PID controller, the controller also receives a signal from the second sensor which it processes using the I portion of the PID controller, the controller using both signals to vary the flow rate of the fluid to achieve a target fluid temperature of the fluid leaving conduit that is constant over a period time.

Preferably the controller is a PID controller and where the controller receives a signal from the sensor which it processes using the P and D portions of the PID controller, the controller also receives a signal from the second sensor which it processes using the I portion of the PID controller, the controller using both signals to vary the flow rate of the fluid to achieve a desired temperature of the fluid at the outlet of the conduit that is preferably constant over time.

Preferably the fluid travels through the heat exchanger in a single pass.

In a further aspect the present invention consists in a method of changing the temperature of a fluid comprising:

passing said fluid through a conduit in thermal contact with the condenser of a vapor compression cycle system, sensing the temperature of the working fluid at the condensing phase of the vapor compression cycle system, controlling the flow rate of said fluid through said conduit on the basis of the sensed temperature.

Preferably sensing also occurs of the temperature of the fluid leaving the conduit, said controlling the flow rate of said fluid through said conduit being on the basis of the first mentioned and second mentioned sensed temperature Preferably the said controlling is done by at least one controller that is a PID controller.

Preferably the at least one controller is a PID controller and where the controller receives a signal from a sensor sensing the first mentioned temperature which it processes using the P and D portions of the PID controller, the controller also receives a signal from a second sensor sensing the second mentioned temperature which it processes using the I portion of the PID controller, the controller using both signals to vary the flow rate of the fluid to elevate the temperature of the water to or towards or near a target temperature that is constant over time.

Preferably the controller is a PID controller and where the controller receives a signal from a sensor that senses the first mentioned temperature which it processes using the P and D portions of the PID controller, the controller also receives a signal from a second sensor sensing the second mentioned temperature which it processes using the I portion of the PID controller, the controller using both signals to vary the flow rate of the fluid to achieve a desired target temperature of the fluid at the outlet of the conduit that is constant over a period of time.

In yet a further aspect the present invention consists in a fluid heater comprising a vapor compression cycle system that includes an evaporator, at least one condenser conduit and a working fluid, a fluid conduit passing through at least part of the condenser conduit, said fluid conduit including an inlet and an outlet for fluid to flow through the fluid conduit, to allow heat transfer between said fluid to be heated and said working fluid, a sensor located at the condenser conduit at where the working fluid is condensing, said sensor providing an output from which the temperature of the working fluid at the condensing phase of the vapor compression cycle system can be determined, at least one of a variable flow rate pump and a flow control valve that can control the flow rate of fluid to be heated through the fluid conduit, a controller operatively connected with the at least one of the pump and valve, to vary the flow rate of fluid through the fluid conduit, reliant on the output from the sensor to achieve a desired target temperature of the fluid leaving the fluid conduit at the outlet.

In yet a further aspect the present invention consists in a fluid heater comprising a vapor compression cycle system that includes an evaporator, at least one condenser and a working fluid, a heat exchanger incorporating said at least one condenser, said heat exchanger including a fluid conduit for fluid to be heated, reliant on heat from the condenser, to pass through, a sensor providing an output from which the temperature of the working fluid at the condensing phase of the refrigeration vapor compression cycle system can be determined, a flow rate controller to control the flow rate of fluid to be heated through the heat exchanger, a controller operatively connected with the flow rate controller to vary the flow rate of fluid through the heat exchanger reliant on the output from the sensor to achieve a desired target temperature of the fluid leaving the heat exchanger.

Preferably the sensor and condenser are encased in heat shrink tubing.

Preferably the sensor is encased in a conductive material prior to being mounted.

Preferably the thermal mass of the system is suitably low to ensure rapid thermal response of the sensor.

Preferably the outer tube of the condenser is profiled.

Preferably the outer tube is dimpled or otherwise formed such that in combination with an internal tube they create a uniform depth of annulus through which the working fluid can flow.

Preferably the outer tube has a spiral profile of grooves rolled into the tube surface such that the internal surface has a spiralling ribbed pattern.

Preferably the sensor and condenser are encased in heat shrink tubing.

Preferably the sensor is encased in a conductive material prior to being mounted.

Preferably the thermal mass of the system is suitably low to ensure rapid thermal response of the sensor.

Preferably the outer tube of the condenser is profiled.

Preferably the outer tube is dimpled or otherwise formed such that in combination with an internal tube they create a uniform depth of annulus through which the working fluid can flow.

Preferably the outer tube has a spiral profile of grooves rolled into the tube surface such that the internal surface has a spiralling ribbed pattern.

Preferably it is the speed of the pump that is varied by the controller.

Preferably it is the speed of the pump that is varied by the controller.

Preferably the period of time is at least 1 minute in duration.

Preferably the controller incorporates a Proportional plus Integral plus differential control, control loop.

Alternatively the controller may be any type of controller that permits stable control of outlet fluid temperature.

Preferably the input signals to the control loop in the controller are condensing temperature (herein after referred to as Tc) and/or condensing pressure (herein after referred to as Cp) and/or Outlet fluid temperature (herein after referred to as Ts) Preferably the controller is a "hybrid" type that uses Tc and/or Pc as an input to a P-D controller and Ts as an input to an Integral (I) controller.

Alternatively, the controller may use condensing Tc and/or Pc and/or Ts in any way that achieved a comparable result to the control methodology described such as by long term averaging or by fuzzy logic.

In a further aspect the present invention may be said to be a fluid heater comprising a vapor compression cycle system that includes an evaporator, at least one condenser and a working fluid, a heat exchanger incorporating said at least one condenser, said heat exchanger including a fluid conduit for fluid to be heated, reliant on heat from the condenser; to pass through, a sensor providing an output from which the temperature of the working fluid at the condensing zone of the condenser of the refrigeration vapor compression cycle system can be determined, a flow rate controller to control the flow rate of fluid to be heated through the heat exchanger, controller operatively connected with the flow rate controller to vary the flow rate of fluid through the heat exchanger reliant on the output from the sensor to achieve a desired target temperature of the fluid leaving the heat exchanger.

In yet a further aspect the present invention may be said to be a domestic water heater comprising:

a vapor compression cycle system that includes an evaporator, at least one condenser and a working fluid, a heat exchanger incorporating said at least one condenser, said heat exchanger including a passage for domestic water to be heated, reliant on heat from the condenser, to pass through, a first sensor located at the condenser to provide an output from which the temperature of the working fluid at the condensing zone of the condenser of the refrigeration vapor compression cycle system can be determined, a second sensor located to sense the temperature of the domestic water exiting the heat exchanger a variable flow rate pump to pump domestic water through said heat exchanger and to be able to vary the flow rate of domestic water through the heat exchanger, a controller operatively connected with the pump to control the variable flow rate of domestic water through the heat exchanger reliant on the output from the first sensor and the second sensor to achieve a desired target temperature of the fluid leaving the heat exchanger.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

DETAILED DESCRIPTION OF THE INVENTION

The present invention includes a control system for the purpose of heat exchange between a heated fluid and a refrigeration vapour compression cycle system. The heating can be the primary purpose of the system or secondary, tertiary or other (e.g. Heat recovery system from an air conditioning or refrigeration system). Where reference herein is made to a refrigeration vapor compression cycle system, it will be appreciated that the application of said cycle may include refrigeration systems, air conditioning systems and other systems that perform similar functions. It will also equally apply to systems with multiple heat exchangers of differing types and other system components The following description will be with reference to a preferred form of the invention where it is applied to heat recovery for the purposes of heating a fluid. It applies particularly to a single pass heat exchanger with a refrigeration vapour compression cycle system to effect a large temperature lift in flowing heated fluid, whilst maintaining a relatively constant and stable heated fluid outlet temperature throughout the operating cycle. For example, the temperature lift is preferably 10 degrees Celcius or higher. Its application is suitable particularly, but not solely where a relatively fixed heated fluid outlet temperature is required. The fluid may be water.

Figure 1:
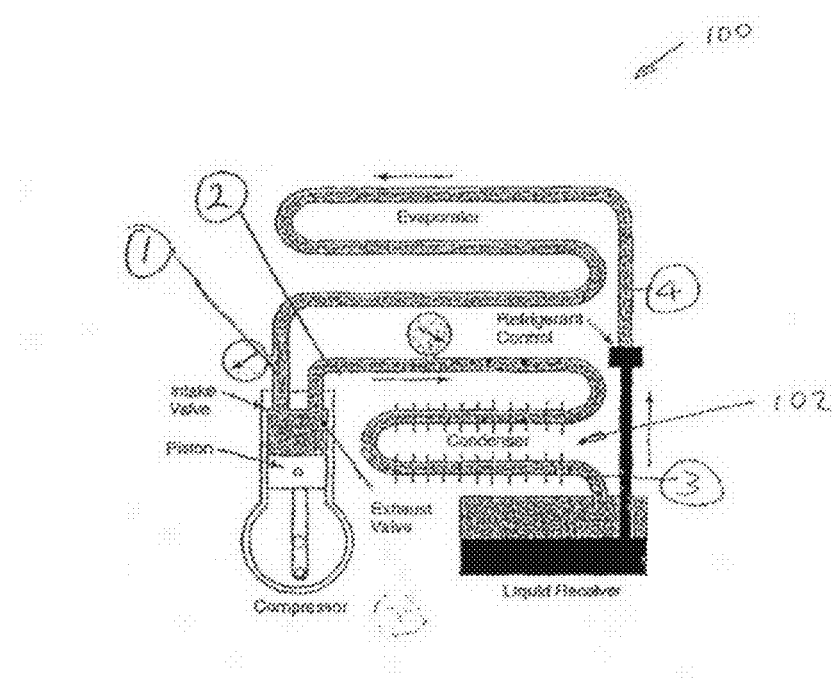
FIG. 1 is a schematic of a simple refrigeration vapor compression cycle system.
Figure 2:
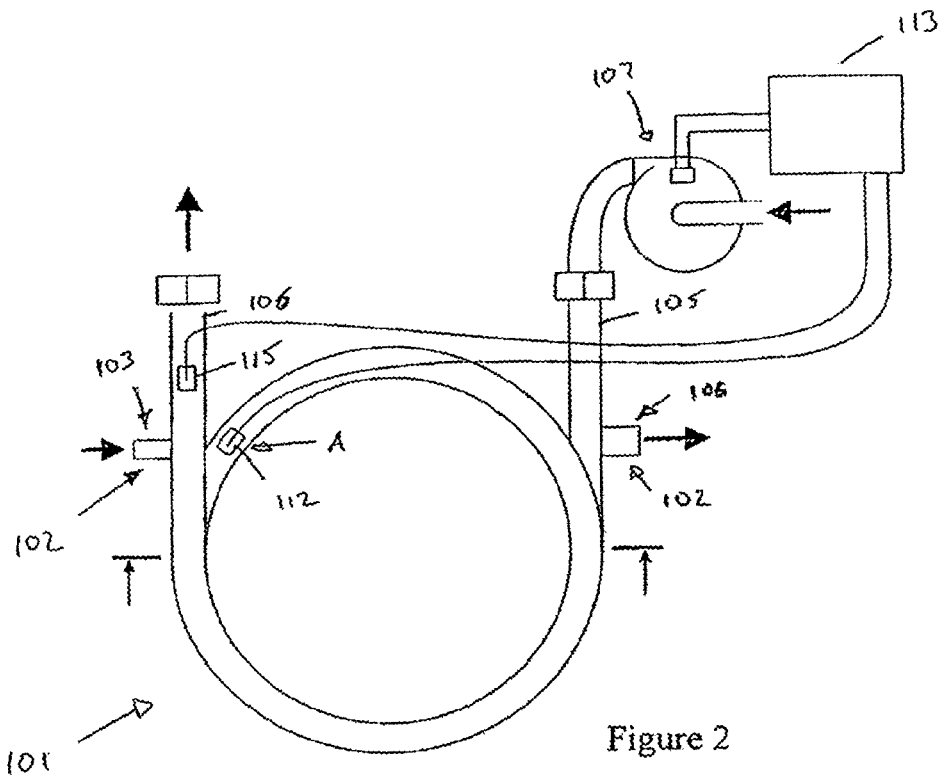
FIG. 2 is a preferred set up of part of the refrigeration vapor compression cycle system in FIG. 1.
Figure 3:
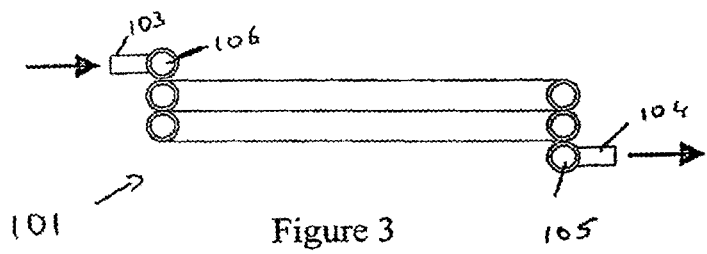
FIG. 3 is a sectional view of the heat exchanger component of FIG. 2.

FIG. 1 shows an example of a simple refrigeration vapour compression cycle system 100 that includes a vapour compression cycle of the working fluid. As refrigeration vapour compression cycles are well known in the art, it is not necessary to describe nor consider the total system, but merely assume existence of the requisite components.

Figure 4:
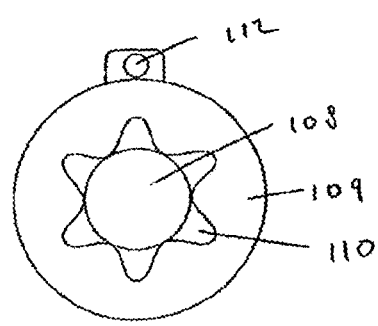
FIG. 4 is a cross sectional view of a double walled heat exchanger tube with a vent space.
Figure 5:
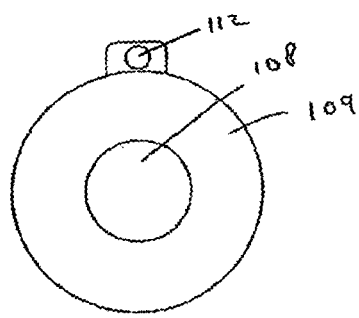
FIG. 5 is a cross sectional view of a single walled heat exchanger tube.

The apparatus includes a heat exchanger 101 and a condenser 102. The heat exchanger 101 is preferably a tube-in-tube heat exchanger with counter flowing fluids. Other types may also be used, including plate, shell and coil, shell and tube heat exchangers. The heat exchanger 101 may be a single walled type for heating service fluids or a double walled type with a vent space for heating potable fluids. FIGS. 4 and 5 show a cross sectional views of a double wall and a single wall tube-in-tube heat exchanger respectively. The double wall heat exchanger in FIG. 4 has a heated fluid conduit 108, and a working fluid conduit 109. A vent space 110 is created between the two conduits. Alternatively a single walled heat exchanger as seen in FIG. 5 includes the heated fluid conduit 108 and working fluid conduit 109 without the additional vent space 110. Other types and/or configurations may also be used.

Heat from the superheated working fluid entering the heat exchanger at the working fluid inlet 103 is transferred to the heated fluid that flows into the heat exchanger 101 at the heated fluid inlet 105. The working fluid exits the heat exchanger at working fluid exit 104 having transferred some of its heat to the heated fluid that exits the heat exchanger 101 through the heated fluid exit 106. The working fluid and heated fluid preferably counter flow each other in the heat exchanger 101.

In use, heated fluid is forced through the tube-in-tube heat exchanger 101 by the use of a pump 107. As the heated fluid travels through the heat exchanger, it takes up heat from the working fluid and exits the heat exchanger at the target heated fluid outlet temperature. Sub-cooled refrigerant exits the heat exchanger at working fluid exit 104.

A temperature sensor 112 is mounted on the heat exchanger 101 to be in thermal contact with the working fluid.

As shown in FIGS. 4 and 5, temperature sensor 112 is located in a sensor pocket that may be potted with a thermally conductive potting compound such as Stycast 2850 and that may be brazed or otherwise thermally conductively bonded to the heat exchanger so as to ensure accurate sensing of the working fluid temperature.

Figure 5A:
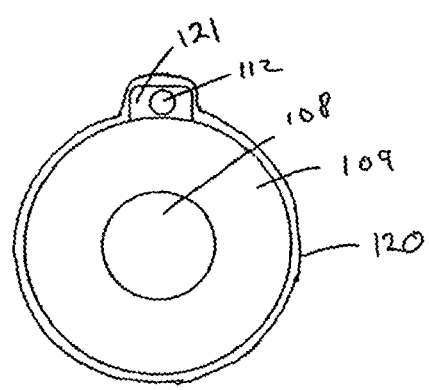
FIG. 5a is a cross sectional view of a single walled heat exchanger tube with a heat-shrink covering.

The sensor 112 is preferably mounted to the heat exchanger in a configuration that provides for rapid thermal conductivity from the working fluid in the condensing phase to the sensing element. The heat exchanger should be designed to permit rapid heat transfer from the working fluid to the sensor 112. A preferred embodiment for mounting the temperature sensor 112 on the condenser is illustrated in FIG. 5a. FIG. 5a shows a single walled heat exchange 101 with a temperature sensor 112 mounted on the upper surface. The sensor is constrained and held in place by heat-shrink tubing 120 and heat transfer from the working fluid conduit 109 to the temperature sensor 112 is augmented by the application of heat transfer compound 121 around the sensing element. The heat transfer compound may comprise a paste or potting compound or thermal adhesive. The sensor 112 is held close to the tube by the contracted heat-shrink tubing 120.

Alternatively the sensor could be held in place by being inserted in a small diameter tube which is subsequently attached to the heat exchanger in the previously described ways.

Alternatively the sensor may be strapped or taped or tied to the heat exchanger with or without the use of thermally conductive materials.

Figure 6:
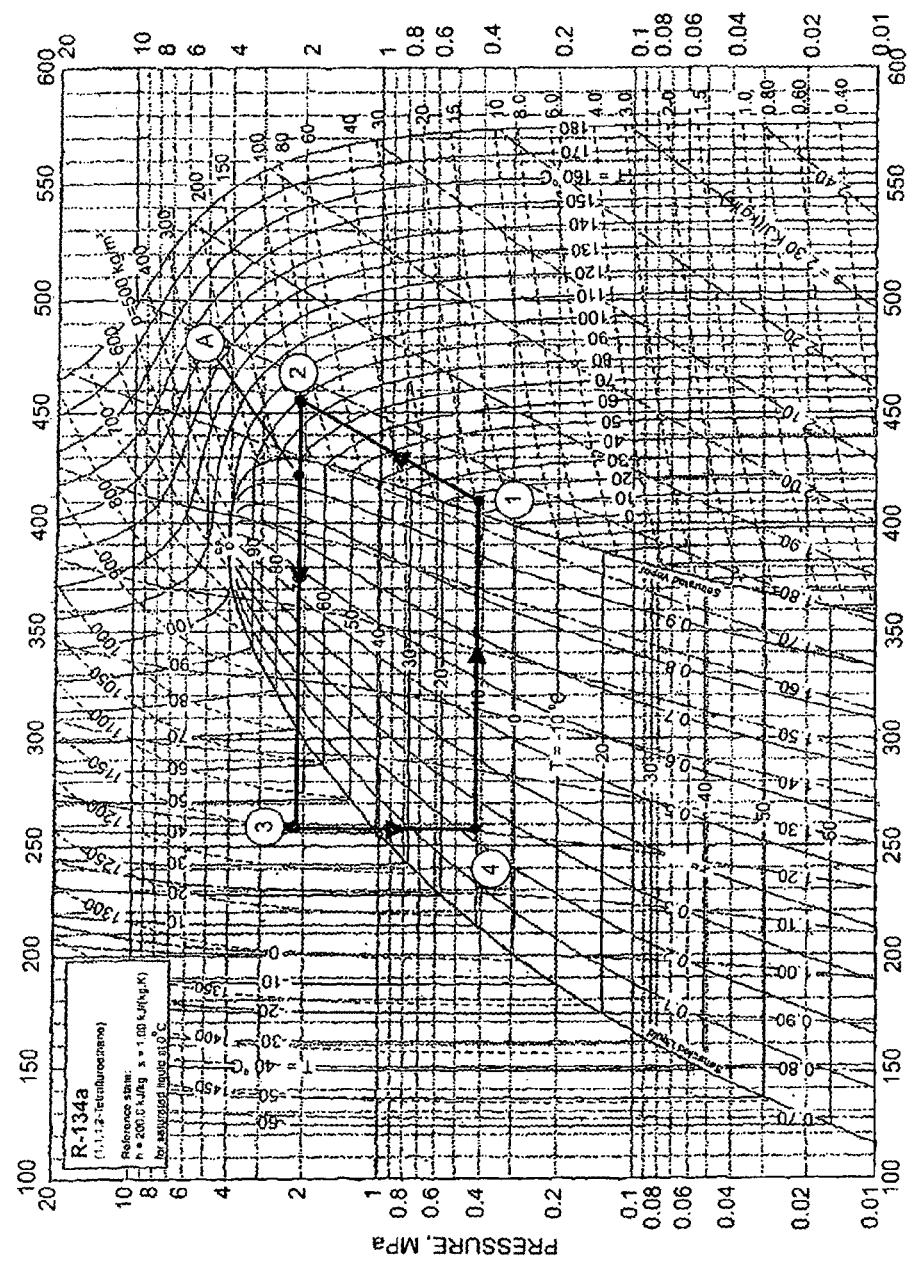
FIG. 6 is a Pressure-Enthalpy graph of refrigerant R-134A.
Figure 7:
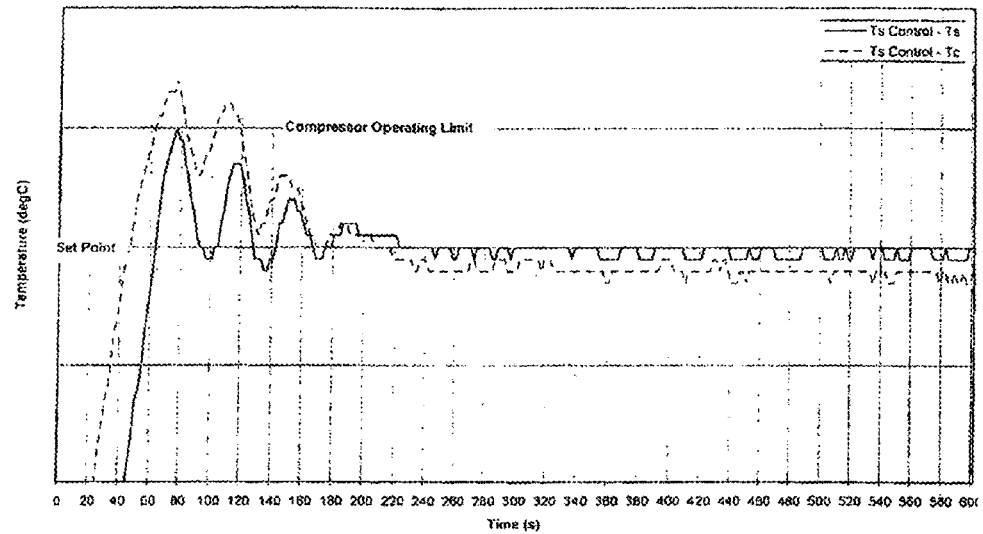
FIG. 7 is a temperature-time graph showing the variation in Ts and Tc during startup with a Ts feedback control system.
Figure 8:
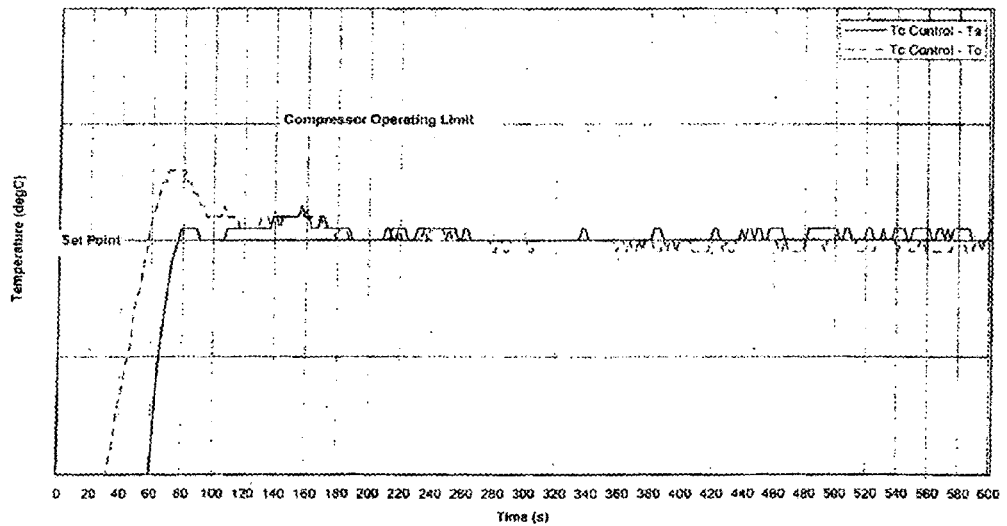
FIG. 8 is a temperature-time graph showing the variation in Ts and Tc during startup with a Tc feedback control system.

The sensor 112 is located in the portion of the heat exchangers (or adjacent thereto but still in the condensing part of the refrigeration cycle system) where the refrigerant fluid is condensing and is thus at relatively constant temperature. This section is immediately after the de-superheating section of the working fluid. FIG. 6 is a graphical representation of the Pressure-Enthalpy (ph) graph of refrigerant R-134a. Point A is indicative of where in the refrigeration cycle system the sensing may occur.

In a preferred embodiment the mass of the mounting assembly should be kept to a minimum to minimize the time constant of the sensing assembly.

In use the temperature sensor 112 sends back a signal to an electronic controller 113. The controller 113 in turn controls the flow rate of the heated fluid through the heat exchanger. This is preferably achieved by controlling the pump 107 (preferably the rpm or speed of the pump). The pump rpm may be varied in order to change the heated fluid flow in the heat exchanger such that the target outlet temperature is maintained. Alternatively, the pump 107 may be run at a fixed speed and the flow rate varied by a controlling fluid regulating valve located in the supply line (Not shown).

In a preferred embodiment the condensing temperature sensor 112 is the primary input variable into the controller 113 that controls the flow rate of the heated fluid.

Temperature sensor 112 may be a suitably designed and selected thermistor, RTD or alternative sensing device. The temperature sensor 112 could alternatively be a refrigerant pressure transducer to achieve a similar result with sensing electronics designed to take a linear voltage or current input from the pressure transducer. The effectiveness and performance would be similar to a temperature sensing device but the cost may be higher.

A temperature sensor 115 may be mounted at the heated fluid outlet 106 to sense the heated fluid outlet temperature. This can be used to provide feedback to the controller to permit more accurate control of the heated fluid outlet temperature. Over time this additional feedback, while not essential part, may be incorporated where more accurate heated fluid temperature setting is required. If used, the temperature sensor 115 can sense the heated fluid outlet temperature which may be averaged over a period of time to determine variation of heated fluid outlet temperature from a desired value. This variation can then be used to modify the condensing temperature setpoint. This variation can be used to improve the accuracy of the outlet temperature of the heated fluid.

Heated fluid temperature sensing may also be utilised for the purposes of controlling auxiliary heat sources that may form part of the system. For example in a domestic heated water system, the present invention may include such an auxiliary heat source to provide a temperature boost to the water or to provide additional heat if the demand for water flow exceed the heating capacity of the heat exchanger or in case of refrigeration cycle malfunction. The auxiliary heat source can then operate in conjunction with of instead of the heat exchanger to elevate water temperature. The controller of the present invention may be designed to offer the capacity to control such auxiliary heat sources as part of the overall system. Such an auxiliary heat source may be an electric heating element. Such an element may be located inside a hot water storage cylinder into which the heat exchanger heated water is fed.

The controller 113 may receive two signal inputs. The first is the condensing temperature Tc as described previously and the second is the outlet fluid temperature Ts. This permits closer control of the outlet fluid temperature whilst retaining excellent response characteristics.

Temperature sensor 115 may be a suitably designed and selected thermistor, thermocouple or RTD or alternative sensing device and may likewise be set in a potting compound as herein before described for the first temperature sensor 112.

In a preferred embodiment the sensors 112 and 115 should have fast time responses such that changes in temperature can be detected quickly. The quicker the temperature fluctuations can be detected the quicker the system can respond to correct the variation. In a preferred embodiment the temperature sensor should have a time constant of less than 2 seconds. In an alternative embodiment the temperature sensor should have a time constant of less than 3 seconds. In another alternative embodiment the time constant of the temperature sensor 112 could be greater than 3 seconds but the controller 113 must have an equivalent reduction in processing time such that the overall control system has a time response of less than 3 seconds.

The controller 113 can receive an input signal(s), process the signal(s), and provide a suitable controlling output signal such that the flow rate can be varied accordingly. In a preferred embodiment the controller is a standard P-I-D controller that permits proportional plus integral plus differential control of the input signal(s). Alternatively the signals are processed using custom control loops, fuzzy logic algorithms or other control schema.

In a preferred embodiment the controller monitors the condensing temperature Tc using temperature sensor 112 and controls the heated fluid flow rate using a PID controller.

In an alternative embodiment the controller monitors the condensing temperature sensor 112 and processes the error via a P-D controller as well as monitoring the outlet fluid temperature Ts sensor 115 and processing this error via an Integral (I) controller. Both inputs are subsequently processed and used to control the heated fluid flow rate.

Experimental Information

In order to show the efficacy of the control systems herein described over conventional fluid outlet temperature control systems, tests were carried out under system operation typically experienced where system conditions were changing rapidly. The two specific conditions tested were: (i) start up and (ii) recovery from a sharp drop in fluid temperature (a) Fluid Outlet Temperature (Ts) Control Refer FIGS. 7, 10,11 and 14

As described earlier, temperature control via sensing of fluid outlet temperature is conventionally used in the art to provide fixed outlet temperatures. The performance of Ts control under startup conditions is shown if FIGS. 7 and 10. As can be seen from FIG. 7, Ts lags Tc by 5-10 deg C. Overshoot of Tc is considerable which is a cause for concern of the integrity and reliability of the vapor compression system. In fact as can be seen, the compressor operation limit was exceeded by several degrees for a short period of time. This is not desirable from an audible noise or system reliability point of view.

Figure 11:
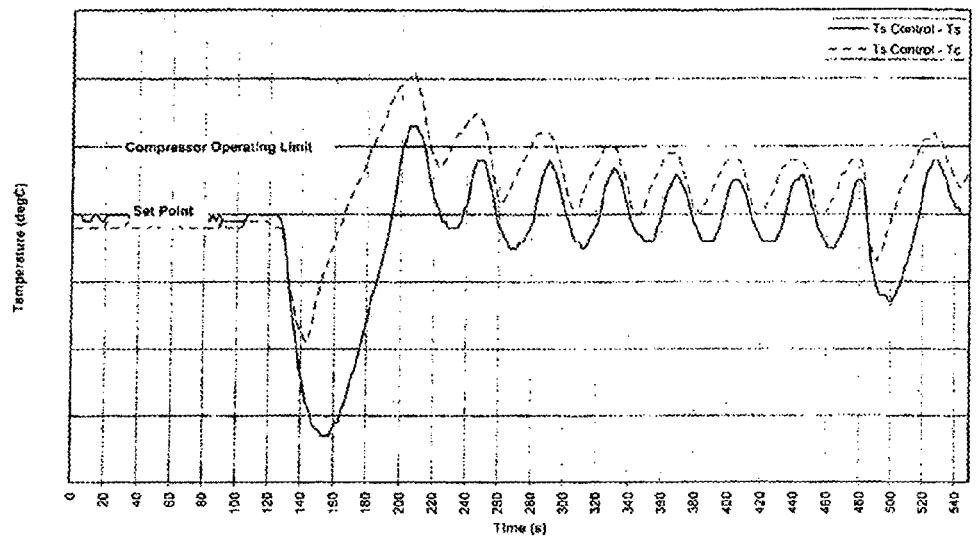
FIG. 11 is a temperature-time graph showing the variation in Ts and Tc after a fluid flow/temperature disturbance has been introduced when using a Ts feedback control system.

FIG. 11 shows response of Tc and Ts after a flow disturbance of short duration, caused by a sharp drop in inlet water temperature. The disturbance induces hunting in the system and the system did not return to stable operation for the duration of the test. The compressor operation limit was exceeded to a greater degree than during the startup test.

Figure 14:
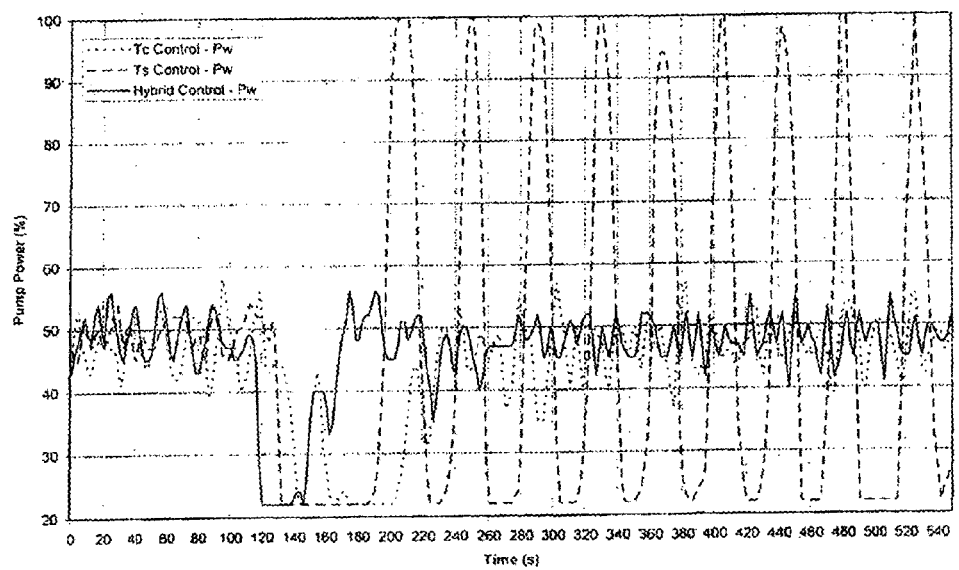
FIG. 14 is a comparison power-time graph showing the variation in the percentage of pump power used after a fluid flow/temperature disturbance has been introduced when using a Ts feedback control system, a Tc feedback control system and a hybrid Tc and Ts feedback control system.

FIG. 14 shows the fluctuation in pump power—this shows severe hunting of between 15-100%

(b) Improved Condensing Temperature (Tc) Control Refer FIGS. 8, 10, 12 and 14

Figure 9:
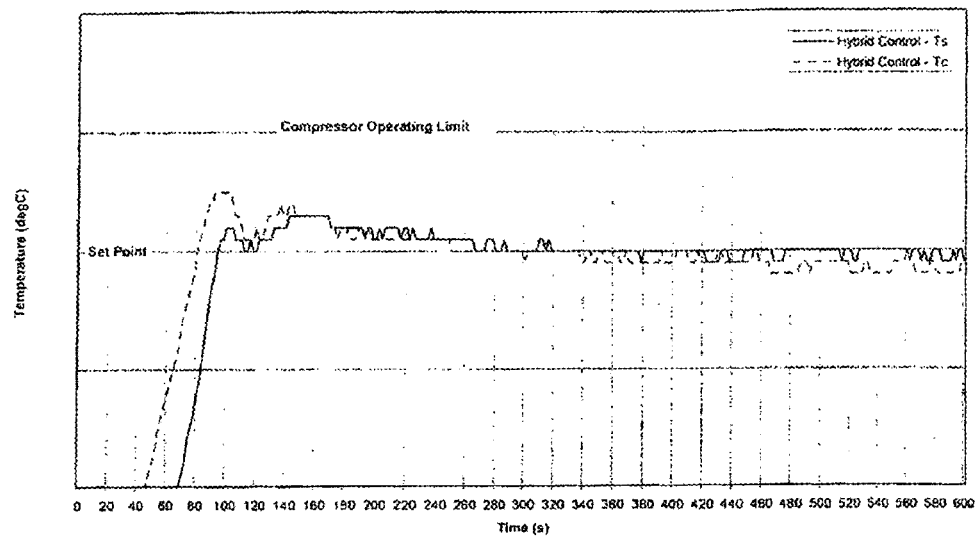
FIG. 9 is a temperature-time graph showing the variation in Ts and Tc during startup with a hybrid Tc and Ts feedback control system.
Figure 10:
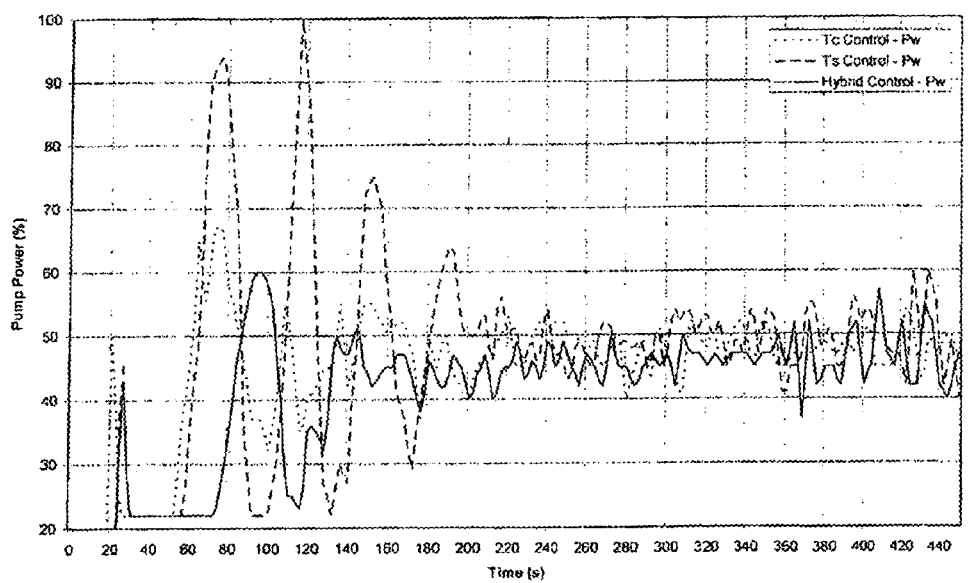
FIG. 10 is a comparison power-time graph showing the variation in the percentage of pump power used during startup when using Ts feedback control system, a Tc feedback control system and a hybrid Tc and Ts feedback control system.
Figure 12:
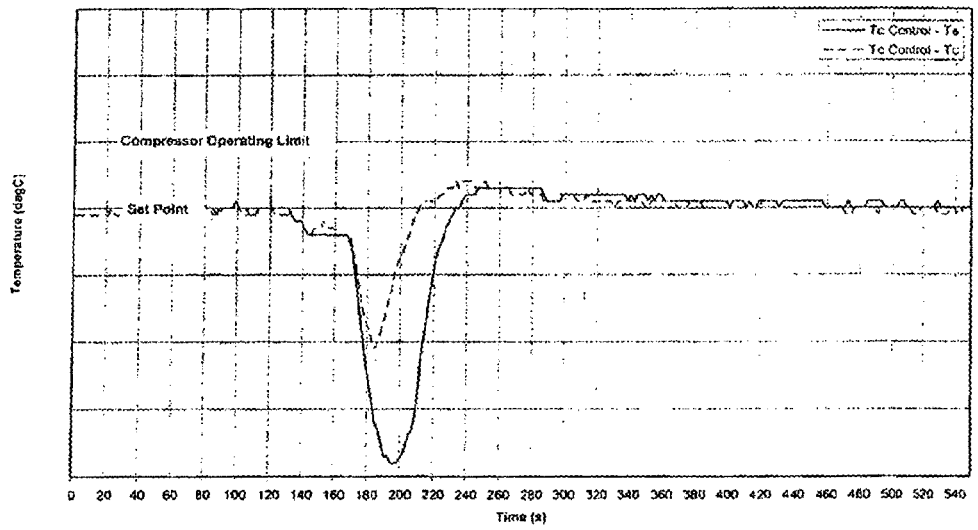
FIG. 12 is a temperature-time graph showing the variation in Ts and Tc after a fluid flow/temperature disturbance has been introduced when using a Tc feedback control system.

FIG. 9 shows start up response with an improved control system using Condensing temperature (Tc) as a proxy for outlet fluid temperature (Ts). The greatly reduced overshoot (50% of the conventional Ts control) and stable operation can be seen. Fluid temperature is higher than the set point temperature and there is not an exact correlation between condensing temperature and outlet fluid temperature. FIG. 12 shows system response during a flow/temperature disturbance. The overshoot is considerably reduced compared with conventional Ts control (70% reduction in overshoot) and how stable the system is afterward.

While using Tc as a proxy for Ts in an application that is optimized for Tc control (ie large temperature rise and low flow) greatly improves the control characteristic.

Figure 15:
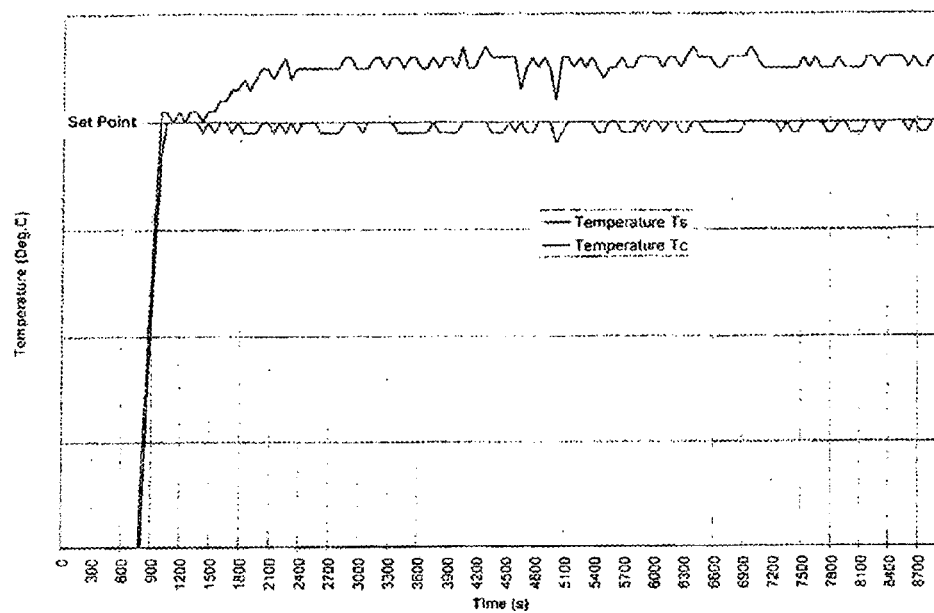
FIG. 15 is a graph showing the variation in Ts and Tc during operation in which the ambient air temperature 0 degrees Celsius when using a Tc feedback control system.
Figure 16:
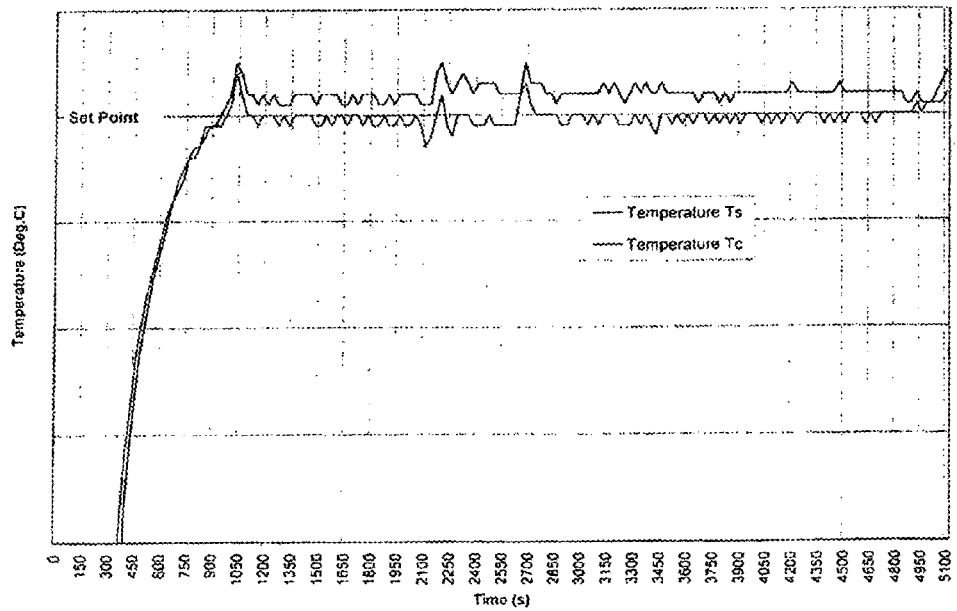
FIG. 16 is a graph showing the variation in Ts and Tc during operation in which the ambient air temperature 23 degrees Celsius when using a Tc feedback control system.
Figure 17:
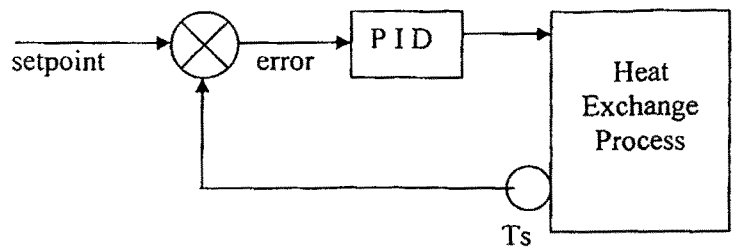
FIG. 17 is a block diagram of a PID loop controller using Ts as the input signal.
Figure 18:
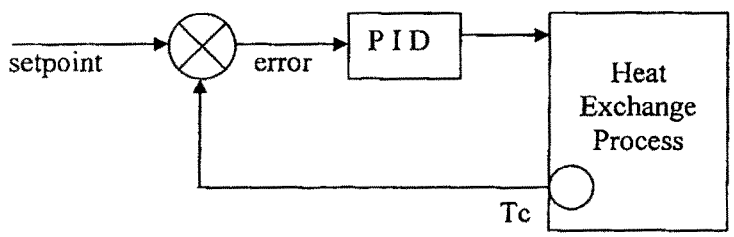
FIG. 18 is a block diagram of a PID loop controller using Tc as the input signal.
Figure 19:
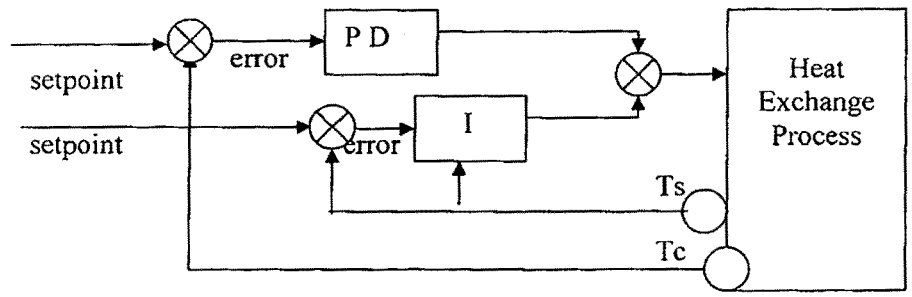
FIG. 19 is a block diagram of a PID loop controller using Ts and Tc as input signals.

The only weakness in using Tc is deviation of the water temperature from the target outlet fluid temperature. This is illustrated in FIGS. 15 and 16. FIG. 15 shows the difference in temperature between Tc and Ts at 23 degrees C. ambient temperature. This is about 1-1.5 deg C. FIG. 16 shows the difference in Ts and Tc at 0 deg C. The temperature difference increases to about 3 deg C.

(c) Further Improved "Hybrid" Control Using Tc-PD and Ts-I Feedback Loop Refer FIGS. 9, 10, 13 and 14

Figure 13:
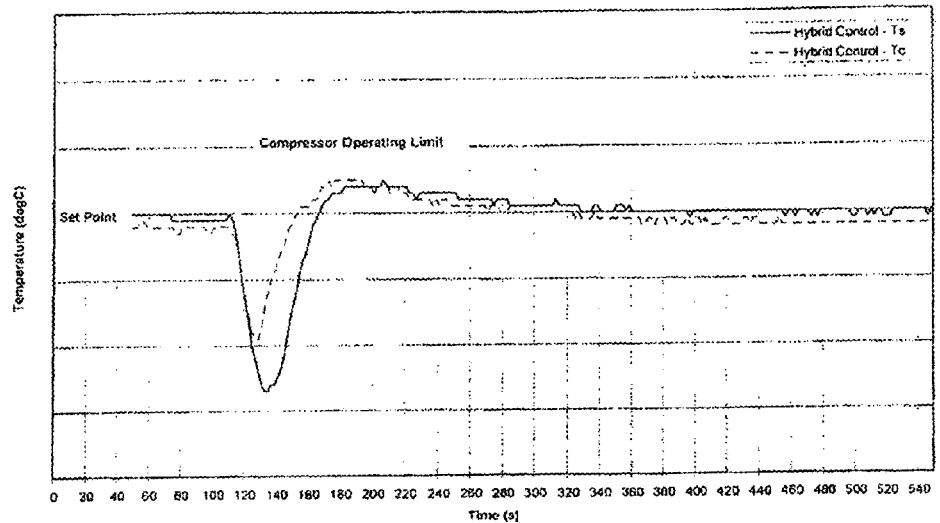
FIG. 13 is a temperature-time graph showing the variation in Ts and Tc after a fluid flow/temperature disturbance has been introduced when using a hybrid Ts and Tc feedback control system.

FIG. 9 shows response and accuracy of the further improved "hybrid" controller using both Tc and Ts as inputs. Overshoot is reduced slightly compared with improved Tc control and the tracking of Ts to the setpoint is very accurate after 5 mins of operation. FIG. 13 confirms high stability of pump operation. FIGS. 13 and 14 confirm that the control recovers in a stable fashion from a flow disturbance and tracks temperature accurately. The "Hybrid" control using Tc-PD and Ts-I feedback loop offers the combined benefits of low overshoot, stable control and accurate temperature tracking over the conventional control method using outlet fluid temperature (Ts) as the input variable to a control valve/controller. Other hybrid systems using both Ts and Tc as input signals can be expected to provide similar (or possibly better) results.

In general, the invention can achieve stable control by using the condensing temperature of the refrigerant fluid as an input variable to a feedback control loop rather than using heated fluid outlet temperature for such purposes. The refrigerant condensing temperature sensing system can respond quickly—eg in the order of seconds—allowing stable control of the heated fluid temperature to be established. It will be appreciated by a person skilled in the art that the present invention can allow for heat recovery from a refrigeration or air conditioning cycle system in a manner that can deliver heated fluid at a temperature at the outlet in a stable manner. The temperature of the outlet heated fluid does not fluctuate significantly over time.

The invention can hence be used in any application where heat recovery from a refrigerant or heat pump or air conditioning condenser is being carried out, and a relatively constant fluid temperature is required. The heating of the fluid may be the primary purpose of the refrigeration cycle system or may be secondary, wherein the primary purpose of the system may be for space heating/cooling.

The invention claimed is:

1. A control system to control the flow rate of a fluid flowing relative to and in thermal contact with the condenser of a vapour compression cycle system, the flow of fluid being captured in a conduit that together with the condenser forms a tube-in-tube heat exchanger, in order to control heating of the fluid via heat exchange with the working fluid, said control system comprising:
   a sensor providing an output correlating to the temperature of the working fluid at the condensing phase of the vapour compression cycle system,
   a flow rate controller to control the rate of flow of fluid relative the condenser,
   a controller operatively connected with the flow rate controller to be able to vary the flow rate of the fluid, reliant on the output of said sensor,
   wherein the sensor is located at the condenser at a zone corresponding to the condensing zone of the working fluid.

2. The control system as claimed in claim 1 where the heat exchanger is a tube-in-tube heat exchanger and the working fluid is contained in the annulus between the inner and outer tubes of said tube-in-tube heat exchanger.

3. The control system as claimed in claim 2 where the sensor is located on an exterior surface of the outer tube of the tube-in-tube heat exchanger.

4. The control system as claimed in claim 1 wherein the conduit includes an inlet and an outlet for the flow of fluid.

5. The control system as claimed in claim 1 where the sensor is located at the condenser corresponding to a location downstream of the working fluid de-superheating occurs.

6. The control system as claimed in claim 1 where the sensor is located at the condenser, proximate to the point of the condenser phase of the vapour compression cycle system where the working fluid first starts to condense.

7. The control system as claimed in claim 1 where the sensor is attached to the condenser in a thermally conductive manner to facilitate heat transfer between the sensor and condenser.

8. The control system as claimed in claim 1 where the fluid is water.

9. The control system as claimed in claim 1 where the flow rate controller is a fluid pump.

10. The control system as claimed in claim 9 where the operating parameters of the pump can be varied by the controller to vary the fluid flow rate.

11. The control system as claimed in claim 1 where the temperature change of the fluid passing through the heat exchanger is greater than at least one of 10, 20, 30, 40 and 50 degrees Celsius.

12. The control system as claimed in claim 1 where a second sensor is provided to sense the temperature of the fluid leaving the condenser and to send a signal to the controller.

13. The control system as claimed in claim 1 where the controller receives a signal from the sensor which the controller interprets to thereby vary the flow rate of fluid to achieve a desired target fluid temperature of fluid leaving thermal contact with the condenser.

14. The control system as claimed in claim 1 where the controller is one selected from the group consisting of a PID controller, feedback controller, fuzzy logic, a P controller, and a PI controller.

15. The control system as claimed in claim 14 where the controller is a PID controller and where the controller receives a signal from the sensor which the controller processes using the P and D portions of the PID controller, the controller also receives a signal from the second sensor which the controller processes using the I portion of the PID controller, the controller using both signals to vary the flow rate of the fluid to achieve a target temperature of fluid leaving thermal contact with the condenser that is constant over time.

16. The control system as claimed in claim 14 where the controller is a ND controller and where the controller receives a signal from the sensor which the controller processes using the P and D portions of the PID controller, the controller also receives a signal from the second sensor which the controller processes using the I portion of the PID controller, the controller using both signals to vary the flow rate of the fluid to achieve a desired temperature of the fluid leaving thermal contact with the condenser that is preferably constant over time.

17. The control system as claimed in claim 1 where the fluid travels through the heat exchanger in a single pass.

18. A control system to control the temperature increase of a fluid, to be varied in temperature via heat exchange with, flowing relative to, condenser of a vapour compression cycle system, the flow of fluid being captured in a conduit that together with the condenser forms a tube-in-tube heat exchanger, said control system comprising:
   a sensor providing an output correlating to the temperature of the working fluid at the condensing phase of the vapour compression cycle system,
   a flow rate controller to control the rate of flow of fluid relative to the condenser,
   a controller operatively connected with the flow rate controller to vary the flow rate of the fluid based on the output of said sensor to thereby achieve a desired target temperature of the fluid leaving thermal contact with the condenser;
wherein the sensor is located at the condenser, at the condenser phase of the vapour compression cycle system where the working fluid first starts to condense.

19. A fluid heater comprising
   a vapor compression cycle system that includes an evaporator, at least one condenser and a working fluid,
   a tube-in-tube heat exchanger comprising said condenser and a fluid conduit through which a fluid can pass in thermal contact with the condenser to allow, via heat exchange between the fluid and the working fluid, the heating of the fluid, a sensor for sensing the temperature of the working fluid at the condensing phase of the vapor compression cycle system, a flow rate controller to control the flow rate of fluid through the conduit, a controller operatively connected with the flow rate controller to vary the flow rate of fluid through the conduit reliant on the output from the sensor to achieve a desired target temperature of the fluid leaving the conduit;

wherein the sensor is located at the condenser, at a zone corresponding to the condensing zone of the working fluid.

20. The fluid heater as claimed in claim 19 where, in the heat exchanger, the working fluid is contained in the annulus between the inner and outer tubes of said tube-in-tube heat exchanger.

21. The fluid heater as claimed in claim 19 where the sensor is located on an exterior surface of the outer tube of the tube-in-tube heat exchanger.

22. The fluid heater as claimed in claim 19 where the sensor is located downstream of the working fluid de-superheating zone of the condenser.

23. The fluid heater as claimed in claim 19 where the fluid is water.

24. The fluid heater as claimed in claim 19 where the flow rate controller is a fluid pump.

25. The fluid heater as claimed in claim 24 where the operating parameters of the pump can be varied by the controller to vary the fluid flow rate.

26. The fluid heater as claimed in claim 19 where the temperature change of the fluid is greater than at least one of 10, 20, 30, 40 and 50 degrees Celsius.

27. The fluid heater as claimed in claim 19 where a second sensor is provided to sense the temperature of the fluid leaving the conduit and to send a signal to the controller.

28. The fluid heater as claimed in claim 19 where the controller receives a signal from the sensor which the controller interprets to thereby vary the flow rate of fluid through to achieve a desired target fluid temperature of the fluid leaving the conduit.

29. The fluid heater as claimed in claim 19 where the controller is one selected from the group consisting of a PID controller, feedback controller, fuzzy logic, a P controller, and a PI controller.

30. The fluid heater as claimed in claim 29 where the controller is a PID controller and where the controller receives a signal from the sensor which the controller processes using the P and D portions of the PID controller, the controller also receives a signal from the second sensor which the controller processes using the I portion of the RED controller, the controller using both signals to vary the flow rate of the fluid to achieve a target fluid temperature of the fluid leaving conduit that is constant over a period time.

31. The fluid heater as claimed in claim 29 where the controller is a PID controller and where the controller receives a signal from the sensor which the controller processes using the P and D portions of the PID controller, the controller also receives a signal from the second sensor which the controller processes using the I portion of the PID controller, the controller using both signals to vary the flow rate of the fluid to achieve a desired temperature of the fluid at the outlet of the conduit that is preferably constant over time.

32. The fluid heater as claimed in claim 19 Where the fluid travels through the heat exchanger in a single pass.

33. A method of changing the temperature of a fluid comprising:

passing said fluid through a tube-in-tube heat exchanger comprising a conduit in thermal contact with the condenser of a vapor compression cycle system, sensing the temperature of the working fluid at the condensing zone of the condenser of the vapor compression cycle system, sensing the temperature of the fluid leaving the condenser, controlling the flow rate of said fluid through said conduit on the basis of the first mentioned and second mentioned sensed temperature.

34. The method as claimed in claim 33 where the said controlling is done by at least one controller that is a PID controller.

35. The method as claimed in claim 34 where the at least one controller is a PID controller and where the controller receives a signal from a sensor sensing the first mentioned temperature which the controller processes using the P and D portions of the PID controller, the controller also receives a signal from a second sensor sensing the second mentioned temperature which the controller processes using the I portion of the PID controller, the controller using both signals to vary the flow rate of the fluid to elevate the temperature of the water to or towards or near a target temperature that is constant over time.

36. The method as claimed in claim 34 where the controller is a PID controller and where the controller receives a signal from a sensor that senses the first mentioned temperature which the controller processes using the P and D portions of the PID controller, the controller also receives a signal from a second sensor sensing the second mentioned temperature which the controller processes using the I portion of the PID controller, the controller using both signals to vary the flow rate of the fluid to achieve a desired target temperature of the fluid at the outlet of the conduit that is constant over a period of time.

37. A fluid heater comprising a vapor compression cycle system that includes an evaporator, at least one condenser conduit of a tube-in-tube heat exchanger and a working fluid, a fluid conduit of said tube-in-tube heat exchanger being substantially concentric with at least part of the condenser conduit, said fluid conduit including an inlet and an outlet for fluid to flow through the fluid conduit, to allow heat transfer between said fluid to be heated and said working fluid, a sensor located at the zone of the condenser conduit where the working fluid condenses, said sensor able to sense the temperature of the working fluid at the condensing zone of the condenser of the vapor compression cycle system, at least one of a variable flow rate pump that can control the flow rate of fluid to be heated through the fluid conduit, a controller operatively connected with the pump, to vary the flow rate of fluid through the fluid conduit, reliant on the output from the sensor to achieve a desired target temperature of the fluid leaving the fluid conduit at the outlet.

38. A fluid heater comprising a vapor compression cycle system that includes an evaporator, at least one condenser and a working fluid, a tube-in-tube heat exchanger incorporating said at least one condenser, said heat exchanger including a fluid conduit for fluid to be heated, reliant on heat from the condenser, to pass through, a sensor able to sense the temperature of the working fluid at the condensing zone of the condenser of the refrigeration vapor compression cycle system, a flow rate controller to control the flow rate of fluid to be heated through the heat exchanger, a controller operatively connected with the flow rate controller to vary the flow rate of fluid through the heat exchanger reliant on the output from the sensor to achieve a desired target temperature of the fluid leaving the heat exchanger.

39. A domestic water heating system comprising:

a vapor compression cycle system that includes an evaporator, at least one condenser and a working fluid, a tube-in-tube heat exchanger incorporating said at least one condenser, said heat exchanger including a passage for domestic water to be heated, reliant on heat from the condenser, to pass through, a first sensor located at the condenser able to sense the temperature of the working fluid at the condensing zone of the condenser of the refrigeration vapor compression cycle system, a second sensor located to sense the temperature of the domestic water exiting the heat exchanger a variable flow rate pump to pump domestic water through said heat exchanger and to be able to vary the flow rate of domestic water through the heat exchanger, a controller operatively connected with the pump to control the variable flow rate of domestic water through the heat exchanger reliant on the output from the first sensor and the second sensor to achieve a desired target temperature of the fluid leaving the heat exchanger.

40. The system as claimed in claim 39 wherein the an auxiliary water heater is provided to elevate the temperature of the domestic water prior to entering the heat exchanger or after exiting the heat exchanger, the auxiliary water heater controlled by said controller.

* * * * *